United States Patent [19]

Nishida et al.

[11] 4,332,909

[45] Jun. 1, 1982

[54] SILICON NITRIDE BASED SINTERED PRODUCT AND METHOD OF PRODUCING THE SAME

[75] Inventors: Katsutoshi Nishida, Yokohamashi; Toshihiko Ochiai, Yokosukashi, both of Japan

[73] Assignee: Tokyo Shibaura Denki Kabushiki Kaisha, Kawasaki, Japan

[21] Appl. No.: 180,627

[22] Filed: Aug. 25, 1980

[30] Foreign Application Priority Data

Nov. 22, 1979 [JP] Japan ................................ 54/150738

[51] Int. Cl.$^3$ ...................... C04B 35/58; C04B 35/56; C04B 35/50
[52] U.S. Cl. ........................................ 501/97; 501/87; 501/92
[58] Field of Search ................ 106/73.2, 73.5; 501/97, 501/87, 92

[56] References Cited

U.S. PATENT DOCUMENTS

| | | | |
|---|---|---|---|
| 3,409,417 | 11/1968 | Yates | 51/309 |
| 3,830,652 | 8/1974 | Gazza | 106/73.2 |
| 3,969,125 | 7/1976 | Komeya et al. | 106/73.2 |
| 4,073,845 | 2/1978 | Buljan et al. | 106/73.2 |
| 4,102,698 | 7/1978 | Lange et al. | 106/73.2 |
| 4,143,107 | 3/1979 | Ishii et al. | 106/73.2 |

FOREIGN PATENT DOCUMENTS 54-99114  8/1979  Japan .................................. 106/73.5

*Primary Examiner*—Mark Bell
*Attorney, Agent, or Firm*—Oblon, Fisher, Spivak, McClelland & Maier

[57] ABSTRACT

A silicon nitride based sintered product produced by sintering a powder mixture consisting essentially of silicon nitride, at least one oxide of yttrium, scandium, cerium, lanthanum and the metals of lanthanide series and at least one metal or metal oxide of iron, nickel and cobalt.

18 Claims, No Drawings

SILICON NITRIDE BASED SINTERED PRODUCT AND METHOD OF PRODUCING THE SAME

BACKGROUND OF THE INVENTION

1. Field of the Invention

The present invention relates to silicon nitride sintered products and a method of producing sintered products comprised essentially of silicon nitride, at least one oxide of yttrium, scandium, cerium, lanthanum and the metals of lanthanide series and at least one metal or metal oxide of iron, nickel and cobalt.

2. Description of the Prior Art

U.S. Pat. No. 3,409,417 discloses dense, refractory compositions of silicon nitride and a pressing adjuvant bonded with iron, cobalt and nickel. This composition is useful for producing hard and strong sintered products.

However, a need continues to exist for a product of increased strength, increased impact resistance, improved wear resistance, improved toughness and improved self-lubricating properties.

SUMMARY OF THE INVENTION

Accordingly, it is an object of the present invention to provide a silicon nitride based sintered product having improved strength.

Another object of the present invention is to provide a silicon nitride based sintered product having improved impact resistance.

Another object of the present invention is to provide a silicon nitride based sintered product having improved wear resistance.

Another object of the present invention is to provide a silicon nitride based sintered product having improved toughness.

Another object of the present invention is to provide a silicon nitride based sintered product having improved self-lubrication.

Another object of the present invention is to provide a method of producing a silicon nitride based sintered product having improved strength.

Another object of the present invention is to provide a method of producing a silicon nitride based sintered product having improved impact resistance.

Another object of the present invention is to provide a method of producing a silicon nitride based sintered product having improved wear resistance.

Another object of the present invention is to provide a method of producing a silicon nitride based sintered product having improved toughness.

Another object of the present invention is to provide a method of producing a silicon nitride based sintered product having improved self-lubrication.

These and other objects have now been attained by the present invention which comprises a silicon nitride based sintered product produced by sintering a powder mixture consisting essentially of silicon nitride, at least one oxide of yttrium, scandium, cerium, lanthanum and the metals of lanthanide series and at least one metal or metal oxide of iron, nickel and cobalt.

DETAILED DESCRIPTION OF THE PREFERRED EMBODIMENTS

Oxides of yttrium, scandium, cerium, lanthanum and the metals of lanthanide series are useful to improve the strength and wear resistance of the sintered ceramic product. The preferred amount of these oxides is from about 0.02 to about 10 weight parts per 100 weight parts of silicon nitride, and more preferbly from 1 to 5 weight parts.

Metals or metal oxides of iron, nickel and cobalt are useful to improve impact resistance, toughness and self-lubricating properties. On the other hand, large amounts of these metals or metal oxides reduce the strength of the product. In view of the foregoing considerations, the preferred amount of these metals or metal oxides present is from about 1 to about 100 volume parts per 100 volume parts of silicon nitride, and more preferably from 2 to 50 volume parts. These metals or metal oxides can be used as alloys or alloy oxides. These metals or metal oxides can be replaced by one or more metals or metal oxides, for instance molybdenum, tungsten, chromium, manganese or their oxides, in the amount of up to about 20% by weight of the metal or metal oxide content.

Chemically stable refractory compounds can replace up to about 50% by volume of the silicon nitride. For instance, nitrides such as aluminum nitride, titanium nitride and zirconium nitride; carbides such as titanium carbide, zirconium carbide and silicon carbide; and silicides such as chromium silicide, tungsten silicide and molybdenum silicide can replace a portion of the silicon nitride.

Sintering aids can be used in the amounts of less than about 10 weight parts per 100 weight parts of silicon nitride. For instance, aluminum oxide, magnesium oxide, silica, boron oxide, lithium oxide and oxide spinels which consist of a divalent oxide such as magnesium oxide, iron oxide, cobalt oxide and nickel oxide associated in approximately equal molar quantities with a trivalent oxide such as aluminum oxide, iron oxide and chromic oxide wherein that the divalent and trivalent oxides are not of the same metal may be used.

In order to produce a high quality sintered product, it is advantageous to use finely divided powdered raw materials. Preferably, the mean particle size is less than 10 microns, more preferably less than 2 microns.

Additionally, a binder may be added to the admixture to assist in forming a molded article. The binder serves to hold the powder mixture together prior to the sintering step. Binders which may be used are those conventionally employed in sintering processes and include stearic acid, paraffin and the like. The amount of binder is not critical but typically will constitute from about 5 to about 10 weight percent of the powder mixture.

The sintering temperature is selected so as to achieve the desired result. The preferred temperature is from about 1400° C. to 1900° C. When the sintering temperature is too low, the sintering step may be ineffective. When the sintering temperature is too high, resolving of silicon nitride will occur. A more preferable sintering temperature is from 1500° C. to 1800° C.

A non-oxidizing atmosphere is preferred for the sintering to prevent oxidation of the metals and silicon nitride. For instance, inert gas, nitrogen and hydrogen atmosphere are available. In particular, when a large quantity of metals are present, a reducing atmosphere is preferable to prevent oxidation to the oxide.

Any sintering method can be employed in the present invention such as sintering at atmospheric pressure, pressurized sintering and sintering at hot isostatic pressure.

The sintered products of the present invention have various characteristics depending on the ratio of materials. Where a small amount of a metal or metal oxide of iron, nickel and cobalt is used, these metals or metal oxides interdisperse with silicon nitride. On the other hand, where a large amount of these metals or metal oxides are used, they form a net-like continuous structure in the silicon nitride porous continuous structure. In either case, the metal or metal oxide is available for self-lubrication. In the later case, the metal or metal oxide is available for toughness.

Having generally described this invention, a further understanding can be obtained by reference to certain specific examples which are provided herein for purposes of illustration only and are not intended to be limiting unless otherwise specified.

EXAMPLES

Mixtures consisting of silicon nitride, aluminum nitride, yttrium oxide, iron, nickel, cobalt, aluminum oxide, cerium oxide and iron oxide ($Fe_2O_3$), having mean particle sizes of 1.5, 1.1, 1.0, 2.0, 2.5, 1.5, 2.2, 1.0 and 0.8 microns, respectively, as shown in the Table were prepared; to which was added 5 weight percent of stearic acid as a binder. The mixtures were press molded at a pressure of 5000 kg/cm$^2$ to produce a powder compact 50 mm × 50 mm × 10 mm. These molded compacts were sintered by hot pressing using a carbon vessel. The sintering was performed at a temperature of 1750° C. for one hour in a nitrogen atmosphere. The sintered products were cut and test pieces prepared. The density, the flexural strength at room temperature and the wear testing by the pin-flat method are shown in the Table.

metal or metal oxide selected from iron, nickel, cobalt, iron oxide, nickel oxide and cobalt oxide, with substantially the same result.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A composition consisting essentially of silicon nitride, 0.02 to 10 weight parts per 100 weight parts of silicon nitride of at least one oxide of yttrium, scandium, cerium, lanthanum and the metal oxides of lanthanide series; and 1 to 100 volume parts per 100 volume parts of silicon nitride of at least one metal oxide of iron, nickel and cobalt.

2. The composition of claim 1, wherein the oxides of yttrium, scandium, cerium, lanthanum and the metals of lanthanide series are present in from 1 to 5 weight parts.

3. The composition of claim 1 or 2, wherein the metal oxide of iron, nickel and cobalt is present in from 2 to 50 volume parts.

4. A composition consisting essentially of silicon nitride, 0.02 to 10 weight parts per 100 weight parts of silicon nitride of at least one oxide of yttrium, scandium, cerium, lanthanum and the metal oxides of the lanthanide series; and 1 to 100 volume parts per 100 volume parts of silicon nitride of at least one metal oxide of iron, nickel and cobalt, wherein the metal oxide of iron, nickel and cobalt is replaced by at least one metal or metal oxide of molybdenum, tungsten, chromium and manganese, in the amount of up to 20 percent by weight.

5. A composition consisting essentially of silicon nitride, 0.02 to 10 weight parts per 100 weight parts of silicon nitride of at least one oxide of yttrium, scandium, cerium, lanthanum and the metal oxides of the lanthanide series; and 1 to 100 volume parts per 100 volume parts of silicon nitride of at least one metal oxide of iron, nickel and cobalt, wherein the silicon nitride is replaced by chemcially stable refractory compound, in the amount of less than 50 percent by volume.

TABLE

| No. of Example | Proportion of Powder Mixture (w-weight parts, v-volume parts) | | | | | | | | Density*1 (g/cc) | Flexural Strength*1 (kg/mm$^2$) | Specific Wear Rate*2 [(mm$^3$/kg · mm) × 10$^{10}$] |
|---|---|---|---|---|---|---|---|---|---|---|---|
| | $Si_3N_4$ (w) | $Y_2O_3$ (w) | $CeO_2$ (w) | Fe (v) | Ni (v) | Co (v) | $Fe_2O_3$ (v) | $Al_2O_3$ (w) | | | |
| 1 | 100 | 0.02 | — | 10 | — | — | — | — | 3.60 | 65 | 25 |
| 2 | 100 | 2 | — | 10 | — | — | — | — | 3.63 | 75 | 10 |
| 3 | 100 | 5 | — | 10 | — | — | — | — | 3.65 | 79 | 8.0 |
| 4 | 100 | 10 | — | 10 | — | — | — | — | 3.71 | 70 | 9.5 |
| 5 | 100 | 5 | — | 10 | — | — | — | 5 | 3.64 | 75 | 9.0 |
| 6 | 100 | — | 5 | 2 | — | — | — | 10 | 3.31 | 70 | 12 |
| 7 | 100 | 5 | — | — | 1 | — | — | 2 | 3.24 | 77 | 15 |
| 8 | 100 | 5 | — | — | — | 50 | — | 2 | 5.21 | 70 | 20 |
| 9 | 100 | 5 | — | — | — | — | 100 | 2 | 4.98 | 65 | 28 |
| 10 | 100 | 5 | — | 10 | 5 | 5 | 5 | 2 | 4.22 | 67 | 18 |
| 11 | $Si_3N_4$ 80(w) AlN 20 (w) | 5 | — | 10 | — | — | — | 2 | 3.65 | 75 | 10 |
| Control 1 | 100 | — | — | 10 | — | — | — | — | 3.50 | 43 | 80 |

*1 Test piece size: 3 mm × 30 mm × 3 mm
*2 Wear testing was performed as follows:
(1) test piece size: pin type: 4 mm ϕ × 30 mm flat type: 10 mm × 50 mm × 5 mm
(2) lubricant: engine oil.

Yttrium oxide or cerium oxide in the above examples can be entirely or partly replaced with scandium oxide, lanthanum oxide or oxides of lanthanide series, with substantially the same result.

Aluminum oxide in the above examples can be entirely or partly replaced with magnesium oxide, silica, boron oxide, lithium oxide or the oxide spinels, with substantially the same result.

Aluminum nitride in the above examples can be entirely or partly replaced with titanium nitride, zirconium nitride, titanium carbide, zirconium carbide, silicon carbide, chromium silicide, tungsten silicide or molybdenum silicide, with substantially the same result.

Iron, nickel, cobalt or iron oxide in the above examples can be entirely or partly replaced with another 6. The composition of claim 5, wherein the chemically stable refractory compound is at least one of aluminum nitride, titanium nitride, zirconium nitride, titanium carbide, zirconium carbide, silicon carbide, chromium silicide, tungsten silicide and molybdenum silicide.

7. A composition consisting essentially of silicon nitride, 0.02 to 10 weight parts per 100 weight parts of silicon nitride of at least one oxide of yttrium, scandium, cerium, lanthanum and the metal oxides of the lanthanide series; 1 to 100 volume parts per 100 volume parts of silicon nitride of at least one metal oxide of iron, nickel and cobalt; and a sintering aid in the amount of less than 10 weight parts per 100 weight parts of silicon nitride.

8. The composition of claim 7, wherein the sintering aid is at least one of aluminum oxide, magnesium oxide, silica, boron oxide, lithium oxide and the oxide spinels.

9. A sintered product which is produced by sintering a powder mixture consisting essentially of silicon nitride, 0.02 to 10 weight parts per 100 weight parts of silicon nitride of at least one oxide of yttrium, scandium, cerium, lanthanum and the metal oxides of lanthanide series; and 1 to 100 volume parts per 100 volume parts of silicon nitride of at least one metal oxide of iron, nickel and cobalt.

10. The sintered product of claim 1, wherein the oxides of yttrium, scandium, cerium, lanthanum and the metals of lanthanide series are present in from 1 to 5 weight parts.

11. The sintered product of claim 9 or 10, wherein the metal oxide of iron, nickel and cobalt is present in from 2 to 50 volume parts.

12. A sintered product which is produced by sintering a powder mixture consisting essentially of silicon nitride, 0.02 to 10 weight parts per 100 weight parts of silicon nitride of at least one oxide of yttrium, scandium, cerium, lanthanum and the metal oxides of the lanthanide series; and 1 to 100 volume parts per 100 volume parts of silicon nitride of at least one metal oxide of iron, nickel and cobalt, wherein the metal oxide of iron, nickel and cobalt is replaced by at least one metal or metal oxide of molybdenum, tungsten, chromium and manganese, in the amount of up to 20 percent by weight.

13. A sintered product which is produced by sintering a powder mixture consisting essentially of silicon nitride, 0.02 to 10 weight parts per 100 weight parts of silicon nitride of at least one oxide of yttrium, scandium, cerium, lanthanum and the metal oxides of the lanthanide series; and 1 to 100 volume parts per 100 volume parts of silicon nitride of at least one metal oxide of iron, nickel and cobalt, wherein the silicon nitride is replaced by chemically stable refractory compound, in the amount of less than 50 percent by volume.

14. The sintered product of claim 13, wherein the chemically stable refractory compound is at least one of aluminum nitride, titanium nitride, zirconium nitride, titanium carbide, zirconium carbide, silicon carbide, chromium silicide, tungsten silicide and molybdenum silicide.

15. A sintered product which is produced by sintering a powder mixture consisting essentially of silicon nitride, 0.02 to 10 weight parts per 100 weight parts of silicon nitride of at least one oxide of yttrium, scandium, cerium, lanthanum and the metal oxides of the lanthanide series; 1 to 100 volume parts per 100 volume parts of silicon nitride of at least one metal oxide of iron, nickel and cobalt; and a sintering aid in the amount of less than 10 weight parts per 100 weight parts of silicon nitride.

16. The sintered product of claim 15, wherein the sintering aid is at least one of aluminum oxide, magnesium oxide, silica, boron oxide, lithium oxide and the oxide spinels.

17. The sintered product of claim 9, wherein the sintering temperature is from 1400° C. to 1900° C.

18. The sintered product of claim 9, wherein the sintering temperature is from 1500° C. to 1800° C.

* * * * *